United States Patent
Collier et al.

(10) Patent No.: US 6,751,494 B2
(45) Date of Patent: Jun. 15, 2004

(54) METHOD FOR THE RECONSTRUCTION OF THE GEOMETRY OF THE INNER SURFACE OF A CAVITY

(75) Inventors: Nick Collier, Burwell (GB); Roger Edwards, Burwell (GB); Ross Jones, Cherry Hinton (GB); David Pooley, Cambridge (GB); Valerie Scott, Cambridge (GB)

(73) Assignee: Phonak AG, Stafa (CH)

( * ) Notice: Subject to any disclaimer, the term of this patent is extended or adjusted under 35 U.S.C. 154(b) by 224 days.

(21) Appl. No.: 10/054,648

(22) Filed: Jan. 22, 2002

(65) Prior Publication Data

US 2003/0139658 A1 Jul. 24, 2003

(51) Int. Cl.[7] .................................................. A61B 5/05
(52) U.S. Cl. ..................................................... 600/407
(58) Field of Search ................................. 600/407–472, 600/111, 175; 434/270, 272, 402; 381/1, 17, 63, 309; 382/118, 154; 356/603; 345/8; 705/27; 700/163; 348/47, 53, 657, 722, 45; 455/519, 566; 73/625, 626; 128/916; 181/129, 135

(56) References Cited

U.S. PATENT DOCUMENTS

| | | | | |
|---|---|---|---|---|
| 5,056,204 A | * | 10/1991 | Bartschi | 29/896.21 |
| 5,419,312 A | * | 5/1995 | Arenberg et al. | 600/108 |
| 5,487,012 A | * | 1/1996 | Topholm et al. | 700/163 |
| 5,784,098 A | * | 7/1998 | Shoji et al. | 348/45 |
| 6,401,859 B1 | * | 6/2002 | Widmer et al. | 181/135 |
| 6,533,062 B1 | * | 3/2003 | Widmer et al. | 181/129 |
| 2003/0164952 A1 | * | 9/2003 | Deichmann et al. | 356/603 |

* cited by examiner

Primary Examiner—Ali Imam
(74) Attorney, Agent, or Firm—Pearne & Gordon LLP

(57) ABSTRACT

The three-dimensional structure of the surface of a cavity is reconstructed. The cavity can be the outer ear canal of a person. A probe with an optical sensor is introduced into the cavity to produce video signals, which are transmitted to a computer device. The computer device transforms the video signals into position data representing the surface of the cavity, thereby defining the three-dimensional structure of the cavity.

30 Claims, 4 Drawing Sheets

METHOD FOR THE RECONSTRUCTION OF THE GEOMETRY OF THE INNER SURFACE OF A CAVITY

BACKGROUND OF INVENTION

An exact reconstruction of the shape of an existing cavity, for example an opening, cave or the ear canal, is needed for various applications to be able to rebuild an exact copy of the cavity, To provide an optimal seat and create also optimal acoustic conditions of elements of hearing devices to be placed into the ear canal, as for example speakers or hearing aids, these elements need to be adapted to the geometry of the ear canal. This geometry is predefined by the physiognomy and is always different for each user.

A known possibility for the customization of these elements consists in offering different cases of the elements for certain basic forms of the ear canal or in equipping the outer wall of the cases with an elastic material which permits a certain adaptation to different designs. This method is, however, only suitable for very small elements and offers neither an optimal seat nor optimal acoustic conditions. The pressure exerted by the elastic surface of the elements onto the ear canal moreover is found unpleasant and can cause even pains.

To get an exact reproduction of the ear canal, especially the outer ear canal, three-dimensional imprints have commonly been taken, from which moulds could be formed for the production of elements of hearing devices with the desired shape. Therefore, Silicone is commonly injected into the ear canal for preparing the imprint. To receive a reproduction as exact as possible of the ear canal, this must be cleaned essentially, i.e. be free of contaminates. As a rule, the whole process lasts between three and five minutes. For the protection of the eardrum a stopper must be brought deeply into the ear canal, and must be removed again after drying the silicone. This process altogether will be regarded by the person affected as rather unpleasant and disturbing. The forming of the case of the hearing device element using the imprint requires between 1.5 and 2 hours, after which frequently further customizations are necessary after putting the case into the ear canal until the definite fit is found.

Broader possibilities for the recording of the geometry of the surface form of cavities lie in the use of ultrasonic apparatuses or X rays. At the first method, the recording of the form of the human ear canal implies relatively high frequencies and it would be necessary that the surroundings of the ear must be freed from growth of hair. Furthermore, the deep inner portions of the ear canal may be covered by other portions of the ear canal and thus preventing the recording of those inner portions. Further problems exists with the exact transmission of the ultrasound either by the body or over the air, to bring about the necessity for separate transmission means (for example a gel), which means on the one hand a great effort and on the other hand can show unpleasant side effects.

The second method, the use of X rays, needs a very expensive equipment and is only conditionally suitable for the desired purpose.

As a rule, the use of a mechanical scanning device will fail if the cavity shows passages full of corners and isn't feasible if the cavity to be determined falls below a certain size as this is the case, for example for the ear canal.

OBJECTS OF THE PRESENT INVENTION

An object of the present invention is to provide a method for the fast and reliable reconstruction and saving of the geometry of a cavity.

A further object of the present invention is to provide such a method for the fast and reliable reconstruction of at least the outer portion of the ear canal.

SUMMARY OF INVENTION

In a preferred embodiment of the invention, for the recognition of the position data, such as topographical data, in a three-dimensional coordination system, a probe with an optical sensor will be introduced from the outside through the opening of a cavity to be determined, such as the human ear canal. The optical sensor is thereby producing video signals or video images, which will be transmitted to a computer device. The computer will then compute by means of known algorithms from the set of video images received by the optical sensor the positioning data of the inner wall of the cavity. Preferably the iterative factorization methods by Poelman and Kanade (Conrad Poelman and Takeo Kanade, "A Paraperspective Factorization Method for Shape and Motion Recovery", Technical report CMU-93-219, Carnegie Mellon University, Pittsburgh) and Han and Kanade (Mei Han and Takeo Kanade, "Perspective Factorization Methods for Euclidean Reconstruction", Technical report CMU-RI-TR-99-22, Carnegie Mellon University, Pittsburgh) will be used to calculate the three-dimensional coordinates of the surface of the cavity. These coordinates now may be directly used to produce a mould by means of numeric controlled tools with the exact shape of the inner wall of the cavity.

As an advantage, the unpleasant injection of Silicon into the ear canal may be prevented as well as the use of an additional stopper to protect the eardrum.

Even more advantageous is the fact, that the entire method is carried out within a very short time with no need of any preparation work around or in the cavity. The only condition to be observed is a clean cavity, to produce the exact shape of the inner wall of the cavity. A further advantage of the present invention is the possibility of performing the measuring of the shape without having an direct and defined reference to the vicinity of the cavity itself, that is the catheter needs not to be calibrated in respect to the cavity and may be moved without guiding aids.

In a further preferred embodiment contrasting points with a diameter of about 50 μm will be applied onto the surface of the cavity. These contrasting points enable an optimal recognition rate by the optical sensor and the algorithm used to determine the positioning data. The contrasting points may preferably be applied in form of ink droplets which may be sprayed onto the surface of the cavity. The use of ink or fluorescent ink provides on one hand a good contrast in relation to the cavity wall itself for reliable optical detection and on the other hand is easy to handle, that is easy to be sprayed and afterwards removed.

The contrasting points may be applied directly onto the surface of the cavity, which therefore only needs to be clean. The cleaning of the ear canal of example may be performed by a simple wash up of the ear canal.

In a further embodiment of the present invention, the contrasting points are represented by particles, preferably small particles which can be fluorescent.

In a further embodiment of the present invention, the contrasting points may be applied in advance onto the surface of a separate thin, elastically body, such as a balloon, which may then be introduced or positioned in to the cavity and pressed close to the surface of the cavity before the insertion of the catheter. This may be performed by applying an overpressure to the inside of this thin body or balloon or by sucking out the air between this thin body and the surface of the cavity. The contrasting points may thereby have already been applied onto the surface of the thin body, either onto the inside or outside of the surface, or may be sprayed or applied after the insertion and inflation of the thin body.

In a further preferred embodiment the contrasting points are transferred by a film onto the surface of the cavity. This method allows the preparation of such films with specific arrangement of the contrasting points with respect of size, shape and distance.

Furthermore, the contrasting points in form of particles may be applied to the surface of the cavity by means of a liquid coat or may be transferred by a foam containing such particles.

In a further preferred embodiment the optical sensor is arranged as flexible or rigid probe. The use of a flexible probe allows the recognition of the surface of cavities with strongly crooked passages. The imaging device may either be arranged at the proximal end of the probe, with glass fibers or lenses for the transmission of the image, or directly at the distal end of the probe. The imaging device is preferably a CCD, CMOS or analog camera device. For the use in small cavities, such as ear canals, the probe diameter is about 2 mm or less, with a focal length of about 2 mm and a resolution of about 50 µm. These parameters allows the recognition of the exact shape of the cavity in a sufficient resolution.

The probe will be inserted into the cavity by the outlet of the cavity, thereby performing a linear forward movement and preferably at the same time a rotational movement around its longitudinal axis thus allowing to cover the entire surface of the cavity, at least in the area to be determined.

The video signals will be preferably transmitted to a computer device, which will perform algorithms to transform those video signals into three-dimensional coordinates of the surface of the cavity.

In a preferred embodiment the video signals from a optical device with telecentric projection are directly treated by using a factorization method, preferably the factorization methods by Poelman and Kanade (Conrad Poelman and Takeo Kanade, "A Paraperspective Factorization Method for Shape and Motion Recovery", Technical report CMU-93-219, Carnegie Mellon University, Pittsburgh) and Han and Kanade (Mei Han and Takeo Kanade, "Perspective Factorization Methods for Euclidean Reconstruction", Technical report CMU-RI-TR-99-22, Carnegie Mellon University, Pittsburgh) to calculate the three-dimensional coordinates of the surface of the cavity, especially the coordinates of the contrasting points of the surface of the cavity.

Furthermore a nonlinear optimization method may be used to calculate the three-dimensional coordinates of the surface of the cavity, especially the coordinates of the contrasting points of the surface of the cavity.

Furthermore, any of the above mentioned reconstruction methods may be applied to subsets of the data and the reconstructed three-dimensional coordinates of these subsets can be combined using methods of 3D geometry to give a 3D reconstruction of all of the cavity surface.

Further a progressive reconstructions may take place, by using the preceding subset of data as an aid for the reconstruction of a succeeding subset of data.

The basis of the above reconstruction algorithm lies in the feature recognition, i.e. the identification and location of point features in each video image generated by the probe. Apart form the use of artificial contrasting points, natural features such as surface colors, blood vessels, surface profile features, e.g. wrinkles, or features attached to the surface, e.g. hairs, may be sufficient for the algorithms as described above.

The present method is not only suited to be used in the medical field, such as the reconstruction of the ear canal for the fabrication of hearing devices or hearing aids or the three-dimensional reconstruction of shapes from images acquired by an optical sensor such as en endoscope, but also for the reconstruction of underground caves, internal spaces within machinery or voids within collapsed structures.

DRAWINGS

These and other objects and advantages of the present invention will become apparent from the following detailed description of the accompanying drawings in which.

Figure 8:
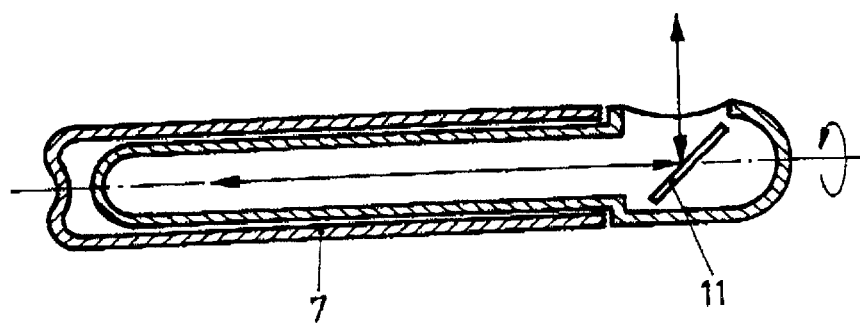
Figure 9:
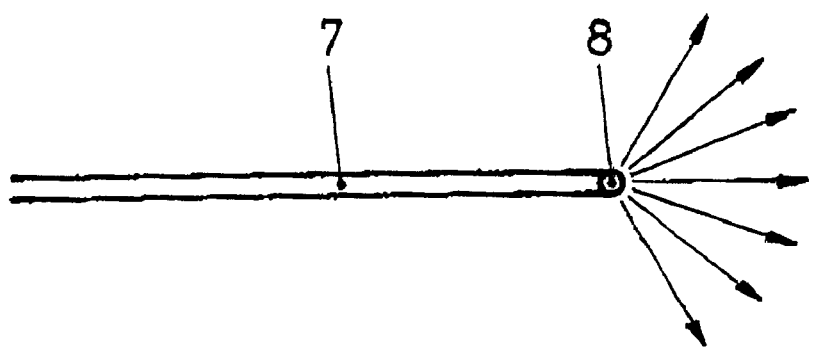
Figure 10:
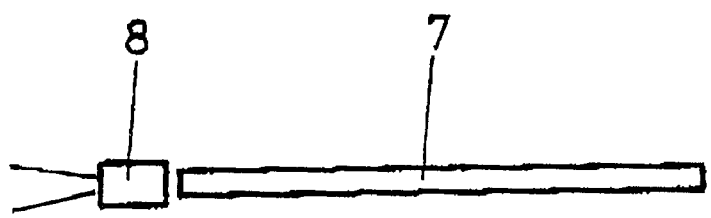

FIG. 8 a schematic sectional view of a probe with a rotating mirror;

FIG. 9 schematic a probe with an optical device with telecentric projection;

FIG. 10 schematic view of a probe with the optical sensor at its distal; and

Figure 11:
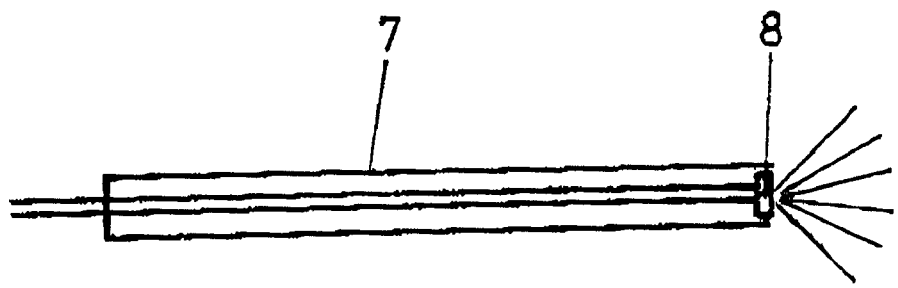

FIG. 11 schematic view of a probe with the optical sensor at its proximal end.

DETAILED DESCRIPTION

Figure 1:
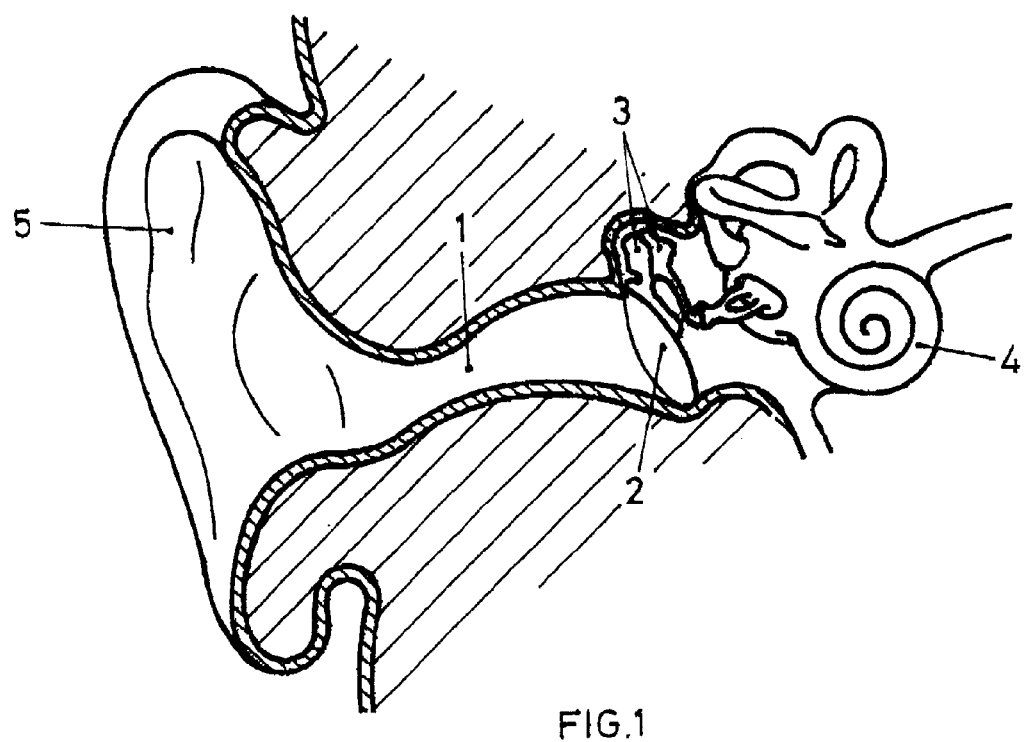
FIG. 1 is a cross sectional view of the human ear.

In the drawings, FIG. 1 shows the cross sectional view of a human ear. The outer ear 1 is separated by the eardrum 2 from the inner ear, in which the ossicles 3 are located. The ossicles 3 are transmitting vibrations of the eardrum, caused by the sound leaded through the outer ear to the eardrum, to the inner ear and finally to the cochlea 4.

By inserting a hearing aid or a hearing element into the opening part from the auricle to the outer ear canal, a reduced hearing ability may be artificially supported and improved.

The hearing aid element, which has to be inserted and must at least remain temporarily in the outer ear canal, has to fit properly in the ear canal as to provide an optimum support by the hearing aid, i.e. the outer shape of this element should be a exact copy of the shape of this part of the ear canal. Deviations of this exact shape will cause on one hand impairments of the functionality of the hearing aids, which leads to a permanent need of adjustment of the hearing aid, and on the other hand a pressure will be forced onto the skin, which is unpleasant and can cause pain.

Figure 2:
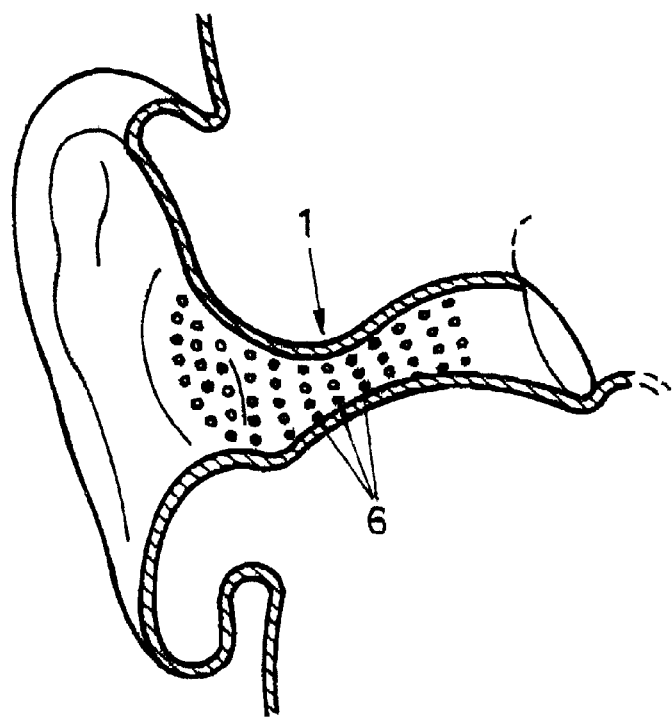
FIG. 2 is a schematic view of the ear canal with contrasting points applied onto the surface.
Figure 3:
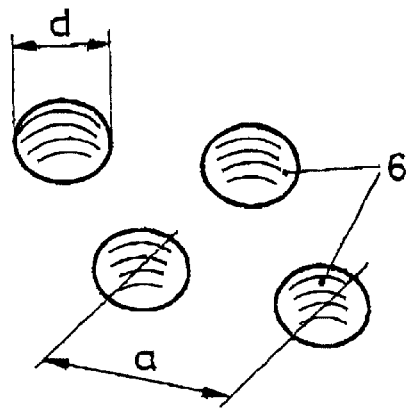
FIG. 3 is a detailed view of the position of several contrasting adjacent points.

FIG. 2 shows again the sectional view according FIG. 1, but with contrasting points 6 directly applied onto the inner skin of the outer ear canal 1. The arrangement of such contrasting points 6 is shown enlarged in FIG. 3. The diameter d of the contrasting points 6 is preferably about 50

μm and the distance between the contrasting points is between 100 μm and 200 μm. Those contrasting points 6 will later represent the nodes of the coordinates of the topography of the outer ear canal.

The contrasting points 6 will preferably be sprayed onto the wall of the ear canal 1, and will consist preferably of a fluorescent colored ink. Such ink points will on one hand build a good contrast with respect to the relatively pale and smooth skin of the outer ear. This provides very clear video signals which will result in very stable and exact results from the algorithms. Furthermore, such ink points may be easily removed after finishing the measuring of those points.

Figure 4:
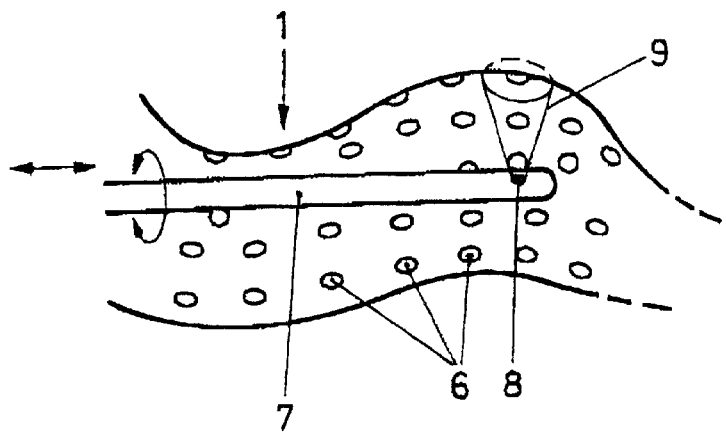
FIG. 4 is a schematic view of the ear canal with inserted probe.

FIG. 4 now shows schematically the outer ear canal 1 with contrasting points 6 applied and with the already introduced probe 7. The probe 7, for instance a rigid probe 7, will be inserted longitudinally and moved linear in direction of the ear drum, whereby rotating around its axis, as indicated by the arrows.

An optical device 8, such as a lens or a camera, is arranged at the end of the probe 7. The probe 7 is preferably a fiberscope, whereby a plurality of parallel glass fibers are arranged to form a bundle to transmit the collected picture onto an electronic recording device, such as an CCD-Array.

The picture signals, for instance received over the probe 7 by a CCD-Array, will be converted into video signals, which will further be processed by a computer using known algorithms to calculate positioning data or 3D-cooridnates of contrasting picture elements. Those contrasting picture elements may be represented by the artificial contrasting points 6 as described above, and thus the coordinates of those contrasting points 6 may be evaluated and stored by the computer. One major advantage by using such algorithms for the reconstruction of 3D coordinates lies in the fact, that the position of the optical device, i.e. the probe 7, relative to the object to be determined is not of importance and has not to be fixed or determined for the calculation.

Mathematical algorithm for the recognition of features, for the determination of feature correspondence and for the reconstruction of the 3D-coordinates of such features are already described above with reference.

Figure 5:
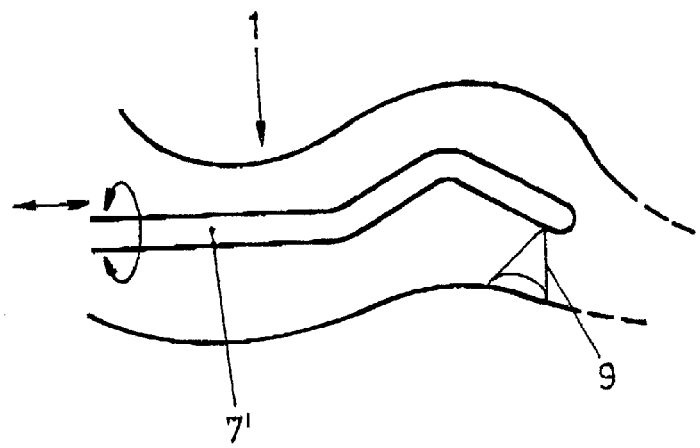
FIG. 5 is a flexible probe.

FIG. 5 shows schematically the use of a flexible probe 7' instead of a rigid probe 7 to receive data even in the case of strongly crooked passages towards the ear drum.

Figure 6:
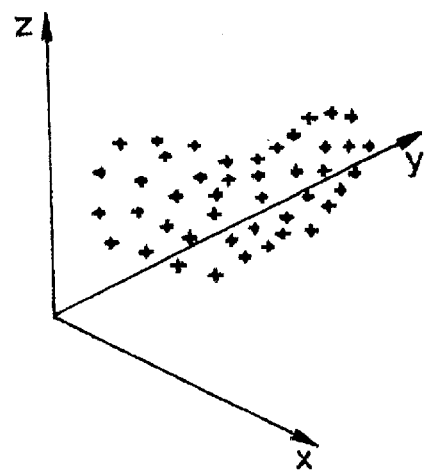
FIG. 6 is the schematic representation of the calculated coordinates of the ear canal according FIGS. 2 and 4.

FIG. 6 shows schematically the calculated contrasting points in a 3D-coordinate system, as they are stored by the computer system after finishing the algorithms. A computer controlled machinery may now be used to reproduce an exact 1:1 copy of the ear canal on the base of those data. This copy my be a mould for the production of the casing of an hearing device, such as an hearing aid, or the casing of the hearing device or hearing aid itself may be directly produced by such a machinery.

Such a copy of the 3D-structure will advantageously not need any finishing work to fit exactly into the ear canal, as it is the case with the common used technique with silicon moulds. As a further advantage, the use of the probe does not implement any additional preparation of the vicinity of the ear canal or the ear canal itself, besides the cleaning of the ear canal before inserting the probe. The whole process is a very quick and easy process and the data will be retrieved without any delay time.

Figure 7:
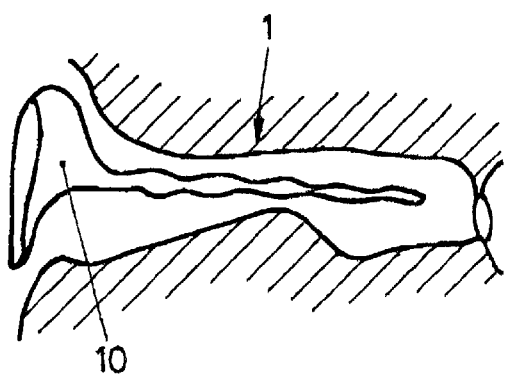
FIG. 7 is a cross sectional view of the human ear with a balloon inserted in the cavity.

FIG. 7 shows the use of a thin cover, such as a balloon 10, to be inserted into the ear canal, instead of applying the artificial contrasting points 6 directly onto the skin of the ear canal. The skin of the balloon 10 may then be pressed onto the skin of the outer ear canal 1 by blowing air into the inside of the balloon 10. The inside of the balloon may now be provided with the artificial points 6 as already described above, if they have not yet been applied in advance. The probe 7 now may be inserted into the ear canal 1 on the inside of the balloon 10 and the contrasting points 6 will be detected by the optical sensor of the probe 7. On one hand, the application of the artificial contrasting points 6 may be avoided by the use of such a balloon, on the other hand, it may be more easy to apply the contrasting points onto the surface of such thin cover material instead of the application directly onto the skin of the ear canal. Furthermore, the use of such a balloon may cover natural features in the ear canal, which could cause problems or faults with the calculation of the coordinates of contrasting points.

On the other hand, it may be possible to use only the natural features on the skin of the ear canal, such as blood vessels, if they cover the area to be determined in a sufficient manner to calculate positioning data for the reconstruction of the shape of the ear canal.

FIG. 8 shows schematically the sectional view of the end of a probe 7 with a rotating mirror 11 at its end portion as optical device. Only this end portion is rotating whereby the probe itself may be moved only transversally. In an other embodiment, the mirror could be rotatable arranged inside a transparent end portion of the probe.

FIG. 9 shows schematically an optical sensor 8 at the end of the probe 7 with telecentric projection.

FIGS. 10 and 11 are showing in a schematically manner probes 7 with the optical sensor 8 at the proximal end of the probe 7 (FIG. 10) and at the distal end of the probe 7 (FIG. 11).

The above described preferred embodiments are intended to illustrate the principles of the present invention, but not to limit the scope of the invention. Other embodiments and variations to these preferred embodiments will be apparent to those skilled in the art and may me made without departing from the scope of the invention as defined in the claims.

What is claimed is:

1. A method for the reconstruction of the three dimensional structure of the surface of a cavity, in a form of positioning data by introducing a probe with an optical sensor into the cavity from the outside of the entrance of the cavity, thereby producing video signals by the optical sensor which are transmitted to a computer device, and whereby said computer device will transform the video signals into position data of the surface of the cavity, which define the three-dimensional structure of the cavity, and whereby contrasting points are applied onto the area of the surface of the cavity to be reconstructed before introducing the probe into the cavity, and that the video signals of the optical sensor are transformed into positioning data of those contrasting points.

2. Method according to claim 1 whereby the contrasting points are applied with an average size of approximately 50 μm in diameter.

3. Method according to claim 1 by applying the contrasting points with an average distance from each other of approximately 100 μm.

4. Method according to claim 1 whereby the contrasting points are applied in a form of water-based or alcohol-based inks.

5. Method according to claim 1 whereby the contrasting points are applied by spraying.

6. Method according to claim 1 whereby the contrasting points are applied directly onto the surface of the cavity.

7. Method according to claim 1 whereby the contrasting points are applied in a form of particles.

8. Method according to claim 1 whereby the contrasting points comprise fluorescent material.

9. Method according to claim 1 whereby the contrasting points are first applied onto a thin film and afterwards transferred from this film onto the surface of the cavity.

10. Method according to claim 1 whereby the contrasting points are transferred onto the surface of the cavity by means of a foam containing contrasting points in a form of particles.

11. Method according to claim 1 whereby the contrasting points are transferred onto the surface of the cavity by means of a liquid coat containing contrasting points in a form of particles.

12. Method according to claim 1 whereby a flexible balloon is inserted into the cavity and its surface put close onto the inner surface of the cavity, and whereby either the surface of the flexible balloon is already provided either on its inner side or its outer side with contrasting points or that contrasting points are applied onto the inner surface of the flexible balloon after its insertion into the cavity, and that the video signals of the optical sensor are transformed into positioning data of those contrasting points.

13. Method according to claim 12 whereby the contrasting points have an approximate diameter of 50 $\mu$m and are applied with an average distance under each other of about 100 $\mu$m.

14. Method according to claim 1 wherein the probe is rigid.

15. Method according to claim 1 wherein the probe is at least partially flexible.

16. Method according to claim 1 wherein the probe is a fiberscope with an optical sensor.

17. Method according to claim 16 wherein a diameter of the probe is at most 2 mm.

18. Method according to claim 1 wherein a rotating mirror is used as the optical sensor.

19. Method according to claim 1 wherein the optical sensor is in a form of a CCD-Device, a CMOS device or an analog camera device.

20. Method according to claim 1 whereby the optical sensor is used with telecentric projection.

21. Method according to claim 1 whereby the optical sensor is used as a forward looking device.

22. Method according to claim 1 whereby the optical sensor is used with an optical axis crossing the longitudinal axis of the probe.

23. Method according to claim 1 whereby the probe is moved forward into the cavity without any rotation around its longitudinal axis.

24. Method according to claim 1 wherein the optical sensor is at the distal end of the probe.

25. Method according to claim 1 wherein the optical sensor is at the proximal end of the probe.

26. Method according to claim 1 whereby the transformation of the video signal into positioning data is made by iterative use of factorization algorithms.

27. Method according to claim 1 whereby the transformation of the video signal into positioning data is made by the use of nonlinear optimisation algorithms.

28. Method according to claim 26 or claim 27 whereby the reconstruction method is applied to subsets of the video data and the reconstructed subsets are combined using methods of 3D geometry.

29. A method for the reconstruction of the three dimensional structure of the surface of a cavity in form of positioning data by distributing points in an irregular manner over the surface, taking images of parts of the surface from different positions, identifying the two-dimensional coordinates of the points in each image, identifying correspondences between points in different images and labeling the respective points, and finally calculating the three-dimensional coordinates of each labeled point by using an appropriate algorithm.

30. A method of manufacturing a hearing device by reconstructing a three dimensional structure of a surface of an outer ear canal in the form of positioning data by applying contrasting points onto an area of the surface of the ear canal and then introducing a probe with an optical sensor into the ear canal from outside of an entrance of the ear canal, thereby producing video signals by the optical sensor which are transmitted to a computer device, and whereby said computer device transforms the video signals into position data of the contrasting points of the ear canal and subsequently forming the outer shell of the housing of the hearing aid by means of computer aided manufacturing using said position data.

* * * * *